United States Patent
Unnerstall et al.

(10) Patent No.: US 12,198,218 B2
(45) Date of Patent: Jan. 14, 2025

(54) METHOD FOR COORDINATING AN IDENTIFICATION AND THE PROCESSING OF A DEFECT OF A WORKPIECE AND DEVICE FOR CARRYING OUT THE METHOD

(71) Applicant: RUD. STARCKE GMBH & CO. KG, Melle (DE)

(72) Inventors: Werner Unnerstall, Melle (DE); Christian Wall, Hiddenhausen (DE)

(73) Assignee: Rud. Starcke GmbH & Co. KG, Melle (DE)

( * ) Notice: Subject to any disclaimer, the term of this patent is extended or adjusted under 35 U.S.C. 154(b) by 472 days.

(21) Appl. No.: 17/612,294

(22) PCT Filed: May 27, 2019

(86) PCT No.: PCT/EP2019/063677
§ 371 (c)(1),
(2) Date: Nov. 18, 2021

(87) PCT Pub. No.: WO2020/239198
PCT Pub. Date: Dec. 3, 2020

(65) Prior Publication Data
US 2022/0222765 A1    Jul. 14, 2022

(51) Int. Cl.
*G06T 1/00* (2006.01)
*B25J 9/16* (2006.01)
(Continued)

(52) U.S. Cl.
CPC .......... *G06T 1/0014* (2013.01); *B25J 9/1661* (2013.01); *B25J 19/021* (2013.01); *G06T 7/001* (2013.01)

(58) Field of Classification Search
CPC ...... G06T 1/0014; G06T 7/001; B25J 9/1661; B25J 19/021; B25J 11/0065
See application file for complete search history.

(56) References Cited

U.S. PATENT DOCUMENTS 5,394,654 A  *  3/1995  Shimbara ............... B24B 27/04
                                                 451/6
6,013,308 A      1/2000  Saito
(Continued)

FOREIGN PATENT DOCUMENTS

CN      108496124 A    9/2018
CN      105269329 B   10/2018
(Continued)

OTHER PUBLICATIONS

JP-2004106080-A - English Trans (Year: 2004).*
(Continued)

*Primary Examiner* — Ian Jen
*Assistant Examiner* — Renee LaRose
(74) *Attorney, Agent, or Firm* — PATENT PORTFOLIO BUILDERS PLLC (57) ABSTRACT

A method for coordinating an identification of a defect in the surface coating of a workpiece and processing same via grinding and/or polishing using at least one grinding or polishing tool that is moveable over the defect in an automatic and computer-controlled manner based a stored program is provided. The surface coating of the workpiece is automatically optically scanned and the scanned position data is detected in a database. The defect is identified by comparing the detected position data with stored target data of the workpiece. Possible movements of the grinding or polishing tool are simulated to process the defect. The setting data for the grinding or polishing tool determined in the simulation is forwarded to a master computer. The determined processing data for processing the defect is transferred to the grinding or polishing tool. The defect is processed using the grinding or polishing tool.

14 Claims, 4 Drawing Sheets

(51) Int. Cl.
*B25J 19/02* (2006.01)
*G06T 7/00* (2017.01)

(56) References Cited

U.S. PATENT DOCUMENTS

| | | | |
|---|---|---|---|
| 2003/0139836 A1* | 7/2003 | Matthews | G01N 21/8806 700/109 |
| 2008/0233837 A1* | 9/2008 | Annen | B24B 1/00 451/37 |
| 2011/0022216 A1* | 1/2011 | Andersson | G05B 19/401 700/114 |
| 2012/0220194 A1* | 8/2012 | Maloney | B24B 37/30 451/5 |
| 2014/0024296 A1* | 1/2014 | Muncy | B24B 7/24 451/527 |
| 2014/0087628 A1 | 3/2014 | Bharadwaj | |
| 2019/0291270 A1* | 9/2019 | Kiyama | B25J 11/0065 |

FOREIGN PATENT DOCUMENTS

| | | |
|---|---|---|
| CN | 109540904 A | 3/2019 |
| DE | 2447730 A1 | 4/1976 |
| JP | 2004106080 A * | 4/2004 |

OTHER PUBLICATIONS

Office Action dated Feb. 15, 2023 in related/corresponding CN Application No. 201980096750.4.
International Search Report mailed Oct. 23, 2019 in related/corresponding International Application No. PCT/EP2019/063677.
Written Opinion mailed Oct. 23, 2019 in related/corresponding International Application No. PCT/EP2019/063677.

* cited by examiner

METHOD FOR COORDINATING AN IDENTIFICATION AND THE PROCESSING OF A DEFECT OF A WORKPIECE AND DEVICE FOR CARRYING OUT THE METHOD

BACKGROUND AND SUMMARY OF THE INVENTION

Exemplary embodiments of the invention relate to a method for coordinating an identification and processing by grinding and/or polishing of at least one defect with at least one grinding or polishing tool, which can be moved in an automatic and computer-controlled manner on the basis of a stored program over the defect in the surface coating of a workpiece, and to a device for carrying out the method.

Particularly in the case of defects in painted surfaces, such as those found on car bodies, especially in the form of dust inclusions, dirt particles, paint noses and craters, which cannot be avoided despite many efforts, these defects must be reworked by grinding and polishing.

In particular, troubleshooting and fault classification of detected faults are extremely time-consuming, even for specially trained and experienced employees.

Based on the defect classification, the appropriate abrasive is then selected and the defect is removed by manual grinding and subsequent polishing. For grinding, abrasives on bases with micro-graining have proven to be the best choice. They can be used as abrasive sheets manually or on hand-guided machines rotatively, eccentrically, orbitally, or by vibration.

According to the defect size, the aim is to keep the generated grinding area as small as possible and to prepare it for subsequent polishing with a minimum roughness depth.

For the grinding process, two different methods with respective advantages and disadvantages are basically known.

In the case of so-called dry grinding, for example, the grinding dust produced in the course of a grinding process collects on the abrasive sheet, which means that only a few defects can be processed per abrasive sheet.

If the grinding is carried out using the so-called wet grinding method, in which the defect and/or the abrasive sheet is wetted with grinding water, considerably more defects can be processed. However, the defect to be processed should be cleaned after the grinding process before polishing due to adhering grinding dust or sludge, which can be very time-consuming, especially on vertical surfaces.

For polishing, an appropriate amount of polishing paste is dosed onto the grinding area and/or a polishing wheel and the grinding area is processed with a polishing machine.

Processing imperfections is very time-consuming and strenuous, especially when the imperfection is located at transitions, curved surfaces, at grease edges or adjacent to crevices.

When processing the defective area, the employee may incur considerable losses in quality and additional work if hand-held grinding and polishing machines are set up at an angle, if, for example, grinding has to be carried out in ergonomically unfavorable places, the wrong micro-grain is used, the abrasive sheet is positioned incorrectly on the backing pad, the abrasive sheet is not changed in good time, the grinding time is exceeded and as a result grinding is carried out too deeply, the quantities of polishing paste for the grinding area are selected too large and thus leave unnecessary polishing paste splashes on the workpiece, such as the body of a motor vehicle, or too little polishing paste is selected and thus the optimum polishing effect is not achieved, and the polishing area becomes too warm due to too much contact pressure and too long a polishing time and the polishing paste flocculates and polishing curls are produced.

Independent product and process audits by a quality management team regularly evaluate the process and initiate improvements and training for employees.

It is known from the prior art to partially automate fault location and fault processing.

During troubleshooting, locating procedures help to determine the position of a defect and to use it for the further process, wherein the locating procedure can be semi-automated or fully automated.

According to the prior art, a distinction is made between stationary locating methods, in which the workpiece, for example the surface of a finished painted car body, is inspected through the system, and a modular locating method, in which the workpiece is inspected according to the outer contour by a detection unit with detector attached to a robot arm.

With stationary locating methods, workpieces of different sizes and characteristics can be inspected in relation to the contour, wherein, due to the method, it is not possible to inspect in shadow areas and undercuts of the workpiece. In addition, the recorded scanned position data and the defect classification are less accurate with such methods than is possible with modular locating methods.

During defect processing, the employee is given partially automated grinding and polishing times or these are carried out automatically.

Exemplary embodiments of the invention are directed to further developing a method of the generic type in such a way that the grinding or polishing result is optimized, in particular the defect detection and the automated grinding and polishing are better coordinated.

The method according to the invention for coordinating an identification and processing by grinding and/or polishing of at least one defect with at least one grinding or polishing tool, which can be moved in an automatic and computer-controlled manner on the basis of a stored program over the defect in the surface coating of a workpiece has the following method steps:

a) Automatic, in particular optical, scanning of the surface coating of the workpiece (5) in a detection station (2) and storage of the scanned position data in a database;

b) Identification of the defect (1) by comparing the detected position data with stored target data of the workpiece (5);

c) Simulation of possible movements of the grinding or polishing tool (7, 8) for processing the defect (1);

d) Forwarding of the setting data for the grinding or polishing tool (7, 8) determined during the simulation to a master computer;

e) Transfer of the determined processing data for processing the defect (1) to the grinding or polishing tool (7, 8);

f) Processing of the defect (1) by the grinding or polishing tool (7, 8).

The method according to the invention significantly improves the exact coordination of the individual method steps, in particular through the interaction of automated defect detection and automated grinding and polishing.

This is accompanied by significant time saving, since, in particular, the automated detection of defects takes less time than the manual or visual detection of defects by trained personnel.

In addition, the automatic storage of coordinates of the detected defects enables direct transfer of these coordinates for alignment of the grinding tool or polishing tool.

The pre-simulation of a grinding or polishing process before the grinding or polishing is carried out ensures that the respective defects can be automatically processed with the available grinding or polishing tools.

The subsequent processing of the defect by the grinding or polishing tool can be optimized, in particular with regard to speed, on the basis of the processing data transferred to a control unit of the grinding or polishing tool.

According to an advantageous embodiment variant of the method according to the invention, the optical scanning of the surface coating of the workpiece is carried out in the detection station with the aid of a movable detection unit.

This makes it possible to increase the accuracy of the locating process in terms of position data, defect size, and defect type. This in turn enables processing with the smallest possible grinding points.

According to an advantageous embodiment variant of the method according to the invention, when an impossibility of automated processing of the defective area is detected by the grinding or polishing tool in step c), the defective area is marked and indicated.

This has the advantage that such defects are directly bypassed by the grinding or polishing tool, which results in a further time saving. The non-processable defect is displayed to the operator on a screen and the coordinates of this defect are stored, which makes it possible to have such defects carried out by trained specialist personnel after the automatically machinable defects have been processed.

According to a further advantageous embodiment variant, the workpiece is subdivided into processing areas before step e), in particular in the case of several detected defects.

This has the advantage that, with the aid of a path planning software, a speed-optimized processing of the defects is possible.

The processing areas are preferably calculated on the basis of the geometry of the workpiece and the accessibility for a respective grinding or polishing tool.

This can significantly improve coordination, especially in the case of several existing grinding or polishing tools. Furthermore, collisions of the tools can be avoided.

According to a further preferred embodiment variant, in the case of several defects to be processed, the at least one grinding or polishing tool is controlled in such a way that the processing of the defects is optimized in terms of time and distance. In particular, several grinding or polishing tools arranged next to each other are controlled simultaneously for processing a respective defect.

This enables the simultaneous processing of several defects, which means that the processing time of the workpiece can be further reduced.

According to a further advantageous embodiment variant, in the case of workpiece parts that can be moved in their holder by a predetermined distance, the opening angle is calculated inline by means of a distance sensor using the stored target data, for example CAD data, of the workpiece and is taken into account during defect processing, so that the grinding and polishing tool can finish the correct surface normal.

Such situations occur in particular with vehicle bodies with doors, hoods or flaps which, after prior painting and drying, are not in their closed position but are only pre-fixed in respective spacers.

According to a further advantageous embodiment variant, the grinding process is carried out exclusively as so-called dry grinding.

This allows a tighter cycle of the processing of the defects, since the grinding dust produced during the grinding process remains bound in the abrasive and thus an intermediate cleaning of the grinding area before polishing can be omitted.

According to a further advantageous embodiment variant, a multiple of the area of the previously abrasively processed surface is processed during the polishing processing of the defect, which in particular has the advantage of a lower heat development in the region of the polishing point and thus prevents flocculation or the like of a polishing agent used.

The device according to the invention for carrying out the method described above comprises a detection station, a grinding station, and a polishing station. At least one grinding tool is designed as a robot, which is connected to a computer and has a supporting device attached to an arm of the robot, can be moved in a rotating and/or vibrating and/or orbital manner and is intended for holding an abrasive belt, and a polishing tool which is designed as a robot which is connected to a computer and has a supporting plate which is attached to an arm of the robot, can be moved in a rotating and/or vibrating and/or orbital manner and is intended for holding a polishing sponge, wherein the arm is movable under computer control.

The use of an abrasive belt is particularly suitable for dry grinding, as such an abrasive belt can be adjusted in cycles after each processing of a defect, so that an unused surface piece of the abrasive belt is available for each defect to be processed, thus enabling a consistent quality of the grinding processing for each defect.

According to a preferred embodiment variant, the at least one grinding or polishing tool is movable along a linear axis, which allows a greater reach of the grinding or polishing tool.

According to a preferred embodiment variant, the polishing tool comprises a wiping device and/or a blowing device and, optionally, a detection unit. The wiping device thus enables automated wiping of the polishing point. The blowing device enables further cooling of the polishing point by blowing compressed air in particular into the polishing sponge. The detection unit makes it possible to check the results.

In particular, the elimination of light tunnels, which are required in the prior art for the manual processing of the defects by grinding, polishing, and wiping the polishing area as well as the result control, the significantly lower cleaning effort, which results from the dry grinding, a waste-optimized form of the abrasive as a belt instead of an abrasive sheet, the omission of further necessary finishing steps for the fastening of the abrasive due to the vacuum fastening used, a lower consumption of polishing pastes due to precisely coordinated dosing through the polishing sponge as well as a significantly lower space requirement, the ecological balance and sustainability are greatly improved with the method and device according to the invention.

BRIEF DESCRIPTION OF THE DRAWING FIGURES

Preferred exemplary embodiments are described in more detail below with reference to the accompanying drawings, wherein.

DETAILED DESCRIPTION

In the following figure description, terms such as top, bottom, left, right, front, rear, etc. refer exclusively to the exemplary representation and position of the detection station, polishing station, grinding station, grinding tool, polishing tool, workpiece and the like selected in the respective figures. These terms are not to be understood restrictively, i.e., different working positions or the mirror-symmetrical design or the like may change these references.

Figure 1:
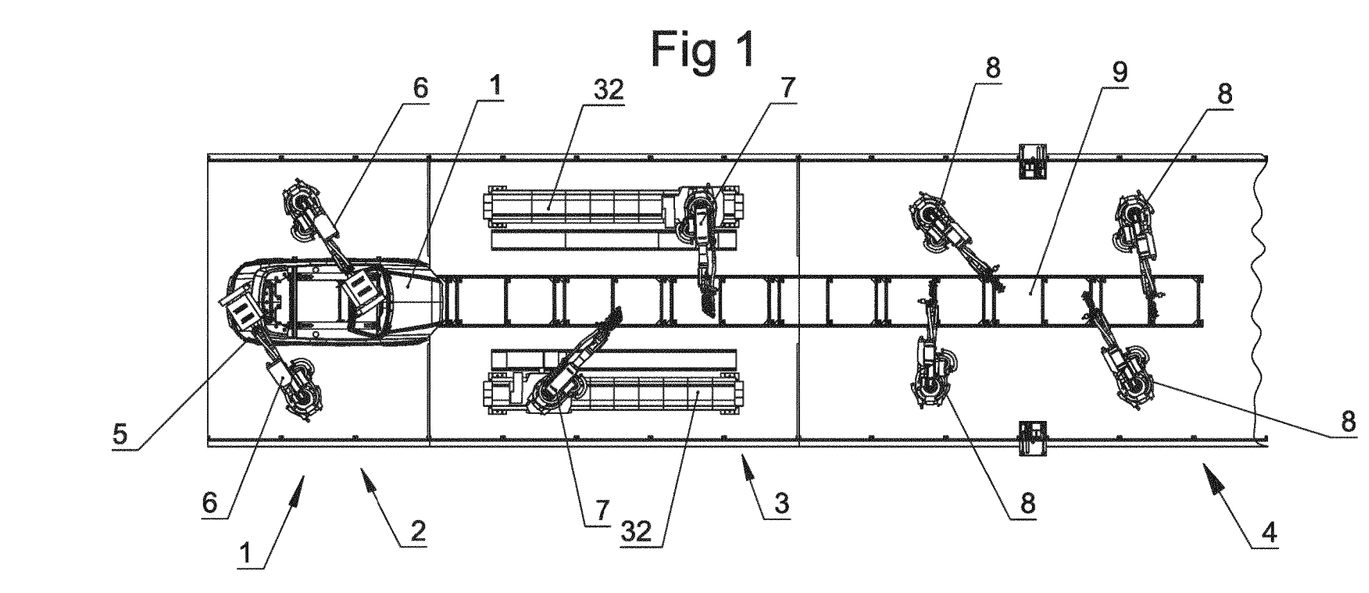
FIG. 1 shows a schematic top view of an embodiment variant of a device according to the invention for carrying out a method according to the invention.
Figure 2:
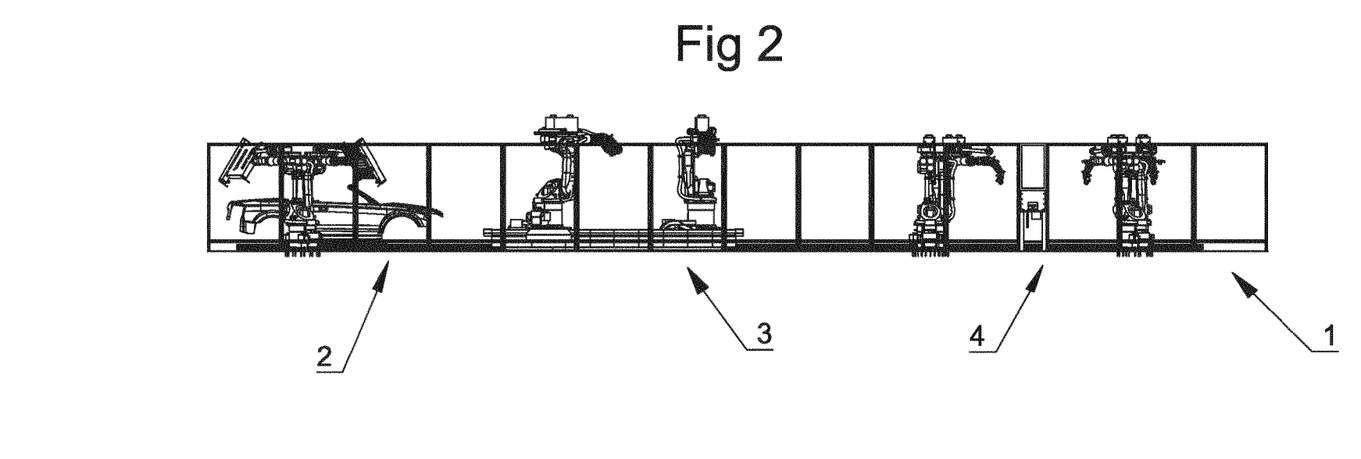
FIG. 2 shows a side view of the device shown in FIG. 1, and FIGS. 3, 4 and 5 show respective perspective views of a detail of the device shown in FIGS. 1 and 2.

In FIGS. 1 and 2, the reference sign 1 altogether denotes an embodiment variant of a device according to the invention for carrying out a method for detecting and processing by grinding and/or polishing at least one defect 1 with at least one grinding or polishing tool 7, 8 in the surface coating of a workpiece 5, which grinding or polishing tool 7, 8 can be moved automatically and under computer control over the defect 1 on the basis of a stored program.

As can be seen in FIGS. 1 and 2, the device comprises a detection station 2, a grinding station 3 and a polishing station 4. The individual stations are interconnected by a rail system 9 on which the workpieces 5 to be processed, for example in the form of body parts of a motor vehicle, can be moved from station to station and fed to the individual stations in a timed manner.

Figure 3:
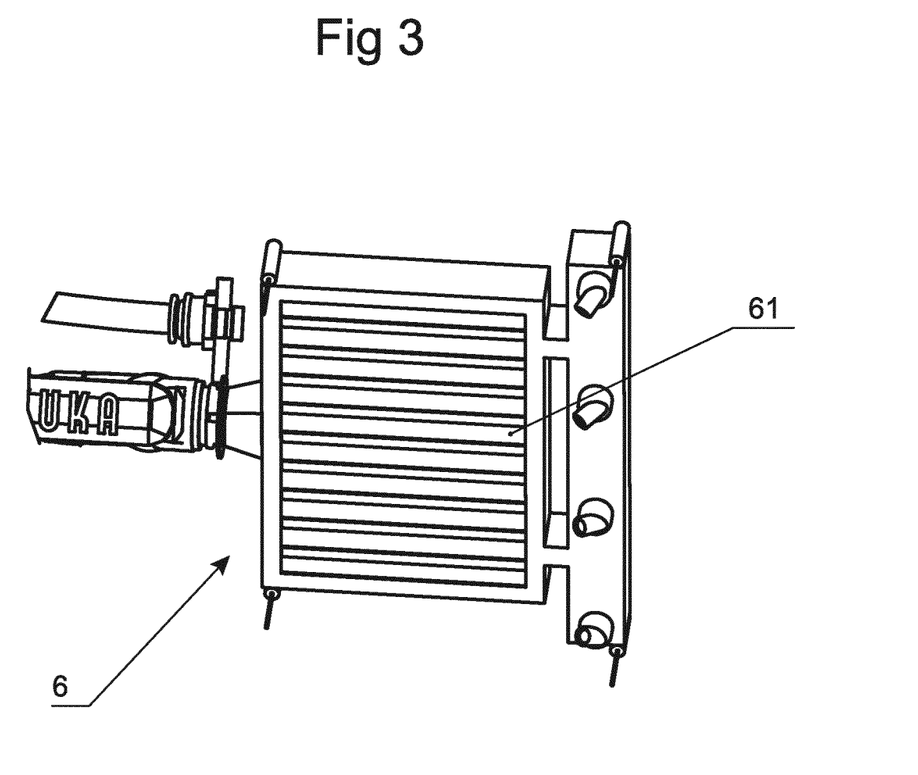

As shown in FIGS. 1, 2, and 3, the detection station 2 comprises two robots with respective robot arms to the end of which an optical scanning device is attached. Preferably, the optical sensing device comprises an electromagnetic radiation source directed towards the workpiece 5 and a detector unit 61 for detecting and subsequently evaluating the beams reflected from the workpiece 5.

The optical scanning device 6 can optically detect all areas of the surface of the workpiece 5 with the help of the movable robot arm.

The robot arm is preferably controlled by a higher-level master computer with a database connected to it, in which the relative coordinates of the surface of the workpiece 5 to be scanned are stored.

Based on the relative coordinates of the surface of the workpiece 5, blocking areas related to the workpiece 5 are permanently stored or automatically determined in advance, for example along edges of the workpiece 5, along grease edges of workpieces 5 designed as body modules, and in tight radii of the workpiece 5. All necessary parameter variables are stored for the processing movement of the robots and are adjusted to the respective defect size. Limit values are stored for the parameter variables, which can be changed for a continuous improvement process.

The optical scanning device 6 scans the surface of the workpiece 5, preferably by applying a light beam. The reflected radiation is detected by a detector and any defects found on the surface of the workpiece 5 are stored digitally in a second database.

During storage, the position data and, optionally, a defect weighting are stored. Together with the aforementioned database of the master computer, in which the relative coordinates of the surface of the workpiece 5 are stored, the detected defect data are compared with the stored relative coordinates of the workpiece 5 and coordinated with the upcoming further automated processing, i.e., the grinding treatment and the subsequent polishing treatment.

Depending on the workpiece to be processed, it is also conceivable to provide only one robot with a defect detection device attached to it in the detection station 2, or even more than two such robots.

It is also conceivable, depending on the size of the workpiece or to increase the accuracy of the locating process in terms of position data, defect size, and defect type, to mount the or a further detection unit on the grinding tool itself.

Because the optical scanning device 6 of the detection station 2 can be moved, it is also possible to scan workpiece areas that cannot be checked by stationary locating systems, such as shadow areas or undercuts of the workpiece.

It is also conceivable to detect only the defect position, which eliminates the need for extensive and expensive position detection of the carrier vehicle and the workpiece.

In this case, the acquisition unit would optically scan the defect area in advance and the more accurate data would be used for further processing in step b).

Figure 4:
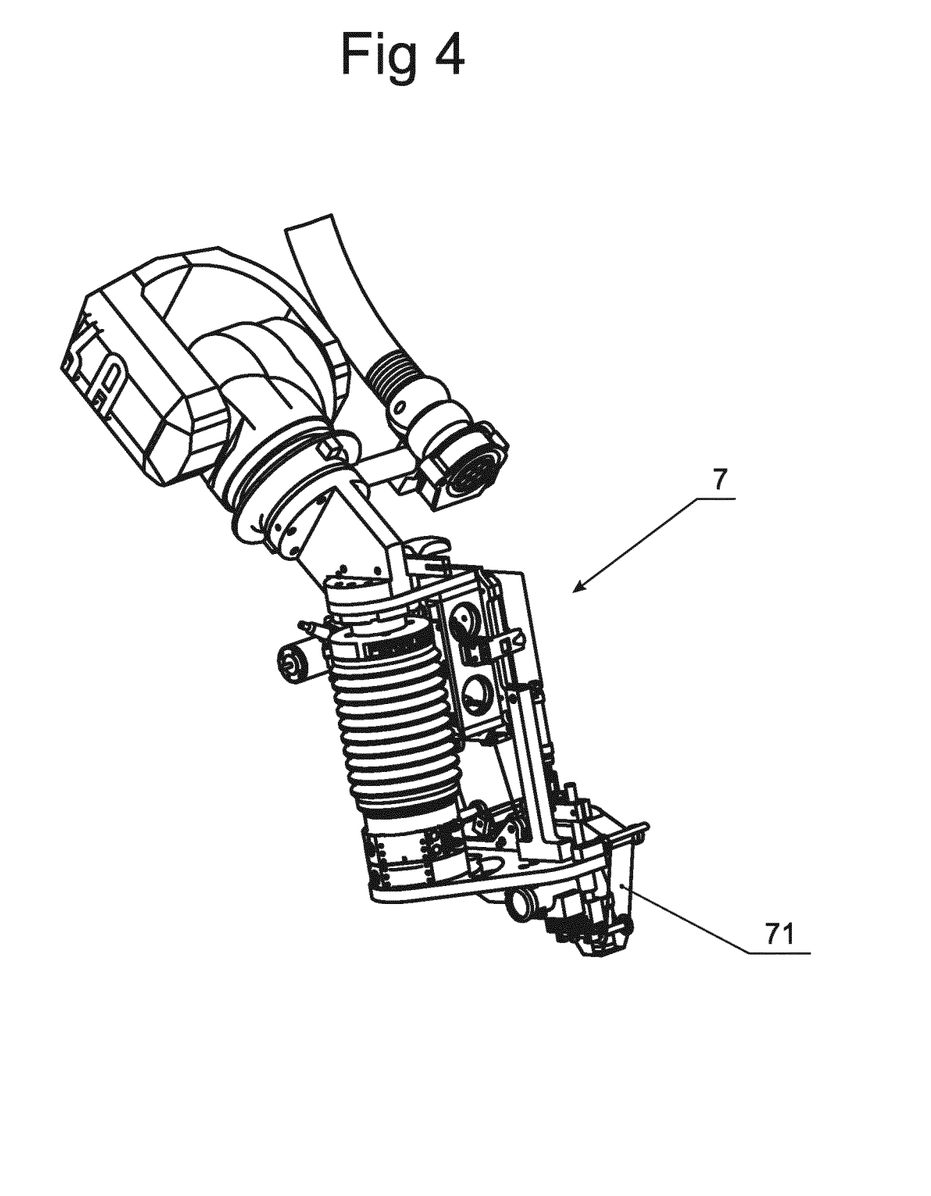

As shown in FIGS. 1, 2, and 4, two robots are also arranged in the grinding station 3 adjacent to the detection station 2. In the exemplary embodiment shown here, the robots are movable along a linear axis 32. It is also conceivable to place the robots of the detection station 2 and/or the polishing station 4 on such linear axes 32. It is also conceivable to arrange the robots of the grinding station 3 in a stationary but rotatable manner in the grinding station 3.

Before the grinding tools 7 of the grinding station 3 are controlled by the master computer, a simulation of possible movements of the grinding tool 7 for processing the respective defect is carried out in advance.

If it is determined during such a simulation that automatic processing of the defect by the grinding tool 7 is not possible, for example due to an unfavorable position of the defect for automatic processing, the coordinates of this defect are transferred to the master computer and displayed to an employee, preferably visualized on a screen.

If the simulation shows that the defect can be processed automatically, the position data of this defect is forwarded to the master computer for further processing by grinding. In the process, the grinding tool 7 and the robot arm to which the grinding tool 7 is attached are brought into the intended position in order to grind the defect.

If, as shown in FIGS. 1 and 2, several robots with respective grinding tools 7 are arranged in the grinding station 3, the workpiece 5 is preferably divided into several processing areas before the processing data determined for processing the defect is transferred to the grinding tool 7.

These processing areas are calculated on the basis of the geometry of the workpiece 5 and the accessibility for a respective grinding tool 7. Subsequently, the grinding tool 7 with the lowest time and distance is controlled in such a way that the processing of the defect is optimized in terms of time and distance.

When grinding, the preferred method is to grind in concentric grinding paths around the defect.

In particular, the calculation of the control of the grinding tools 7 and, in the subsequent polishing process, also of the polishing tools 8 is carried out with the aid of software in such a way that the defective area of the workpiece 5 to be processed is processed with optimized speed.

When processing the defects, it is also taken into account that, in the case of several grinding or polishing tools working simultaneously, the defects can be processed in parallel without collisions between the grinding or polishing tools or between the robots and the robot arms, on each of which such a grinding or polishing tool is arranged.

Preferably, after the grinding process has been completed, an evaluation is carried out by the master computer using statistical methods in order to further improve the automation of the processing of the defects, in particular by reducing the number of processing steps.

The same applies essentially to the polishing of the defects in polishing station 4, which is adjacent to grinding station 3.

In the case of workpiece parts that can be moved in their holder by a predetermined distance, the grinding or polishing tool is aligned accordingly or it compensates for slight deviations by gently placing it on the workpiece part of the workpiece 5.

Such situations occur, for example, in vehicle bodies with doors, hoods or flaps which, after having been previously painted and dried, are not in their closed position but are only pre-fixed in respective spacers and can be moved into the closed position by exerting pressure.

Thus, preferably in the case of opening positions of a section of the workpiece 5 to be processed of up to 1°, such deviations from the stored coordinates are compensated for by gently placing the processing tools on the section of the workpiece 5 to be processed in the normal direction.

Alternatively, it is also possible to calculate the opening angle by means of an upstream distance sensor before the grinding tool 7, in particular, is set down and thus to take it into account during the grinding operation.

As shown in FIG. 4, grinding tools 7 that employ dry grinding are preferably used for the grinding process. For this purpose, the grinding tool 7 preferably comprises an abrasive belt 71 which, after each grinding operation has been carried out, is displaced to such an extent that an unused part of the abrasive belt is used for the following grinding operation. The abrasive belt 71 is thereby preferably held by vacuum on a backing pad of the grinding tool 7.

This means that intermediate cleaning of the grinding area before polishing is no longer necessary, as the area around the defect is completely free of dust and the abrasive can be changed during breaks, for example.

The micro-grain used here is matched to the polishing paste used. The preferred micro-grain size is a micro-grain size outside the FEPA-P range with a maximum roughness depth of less than 0.5 µm.

In abrasive treatment, the same micro-grain is preferably used for all defect types or sizes. In the case of larger defects, grinding is carried out several times, but always with an unused abrasive, wherein the grinding movement is adapted to the defect size. By using an unused abrasive, the surface roughness of the grinding area is within a narrow tolerance range even when processing larger defects.

Figure 5:
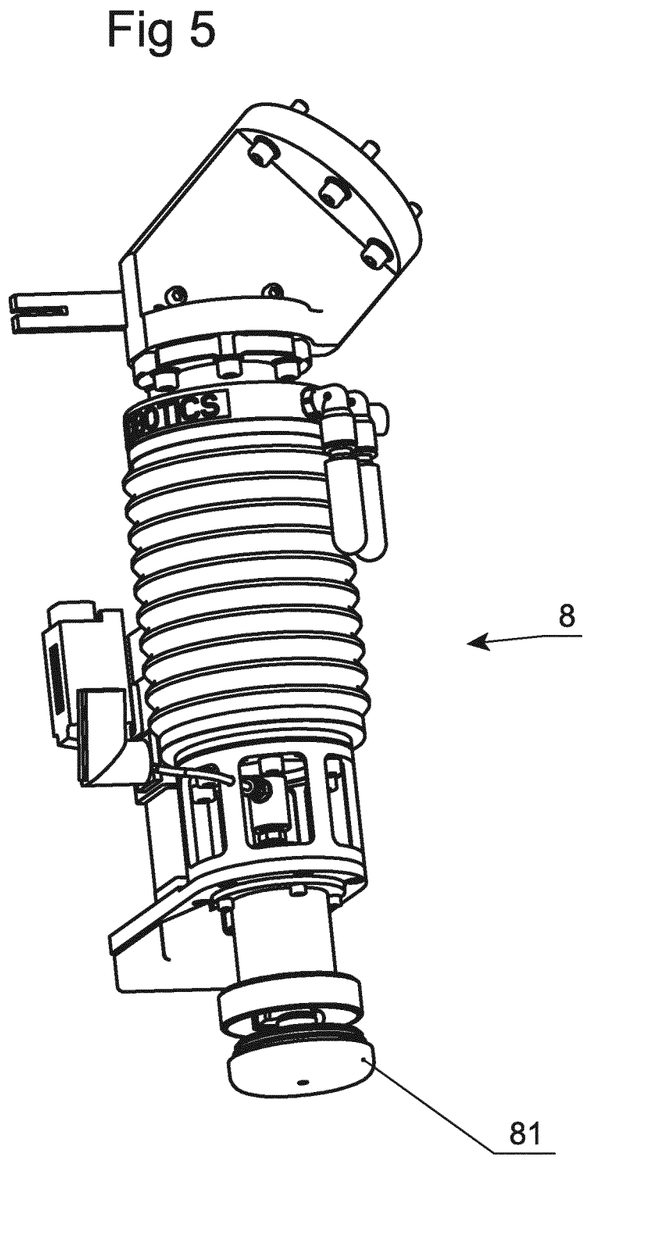

As can be seen further in FIG. 5, the polishing tool 8 has a polishing device attached to a robot arm with a polishing sponge through which the polishing agent, in particular in the form of a polishing paste, can be supplied. It is also conceivable to feed the polishing agent directly onto the grinding point or into the polishing sponge itself.

A time-consuming wetting of the polishing sponge surface can be omitted by at least tripling the polishing paste dosage once after changing the polishing sponge.

It is also conceivable to reprocess the polishing sponge after use with the aid of a pad washer and to continue using it. According to a process variable, the polishing sponge is then preferably replaced after the third cleaning.

The area of the polishing treatment at the respective defect is preferably several times larger than the area of the surface previously processed by grinding. Especially in the second half of the polishing time, the heat development can thus be minimized by changing the contact pressure and by cooling by means of compressed air into the polishing sponge.

Furthermore, the polishing tool 8 preferably comprises a wiping device, for example in the form of a microfiber cloth or a cleaning sponge, in order to enable automatic wiping of the polishing area. The wiping device is thereby preferably attached to a robot arm together with the polishing device 8, wherein the wiping device is designed to be pivotable.

Furthermore, the polishing tool 8 preferably comprises a blowing device by means of which compressed air can be applied to the polishing point for cooling the latter. In particular for a close cycle, in which the polishing medium is fed onto the polishing point into the polishing sponge itself or through the polishing sponge to the polishing point, a heat development arising during polishing can be minimized in particular by changing the contact pressure of the polishing sponge on the point to be polished and by cooling by means of the previously mentioned compressed air.

It is also conceivable that a detection unit 6 mounted on the polishing tool optically scans the processed areas and uses this for checking the results.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Defect
2 Detection station
3 Grinding station
32 Tool rail/linear axis
4 Polishing station
5 Workpiece
6 Detection unit
61 Detector
7 Grinding tool
71 Abrasive belt 8 Polishing tool
81 Polishing sponge
9 Rail system

The invention claimed is:

1. A method for coordinating identification of at least one defect and processing the at least one defect by grinding and/or polishing with at least one grinding or polishing tool, which is moveable in an automatic and computer-controlled manner based on a stored program over the defect in a surface coating of a workpiece, the method comprising:
   a) automatically optically scanning, in a detection station using a movable detection unit, the surface coating of the workpiece and storing scanned position data in a database;
   b) identifying the at least one defect by comparing detected position data with stored target data of the workpiece;
   c) simulating possible movements of the at least one grinding or polishing tool for processing the at least one defect to generate setting data for the at least one grinding or polishing tool, wherein when an impossibility of automated processing of the at least one defect by the at least one grinding or polishing tool is detected in step c), the at least one defect is marked and indicated;
   d) forwarding the setting data for the at least one grinding or polishing tool to a master computer;
   e) transferring determined processing data for processing the at least one defect to the at least one grinding or polishing tool, wherein before step e), the workpiece is divided into processing areas, wherein the processing areas are calculated based on geometry of the workpiece and accessibility for a respective one of the at least one grinding or polishing tool; and
   f) processing the at least one defect by grinding with the at least one grinding or polishing tool.

2. The method of claim 1, wherein when the at least one defect is a plurality of defects, the at least one grinding or polishing tool is controlled in such a way that the processing of the plurality of defects is optimized in terms of time and distance.

3. The method of claim 2, wherein the at least one grinding or polishing tools include a plurality of grinding or polishing tools arranged next to one another and configured to be controlled to simultaneously process a respective one of the plurality of defects.

4. The method of claim 1, wherein when the workpiece includes workpiece parts that are moveable in a holder by a predetermined distance, the at least one grinding or polishing tool is controlled in such a way that the at least one grinding or polishing tool is aligned according to a surface normal in accordance with the stored target data, or deviations are compensated for by gentle placement on the workpiece.

5. The method of claim 1, wherein the grinding is exclusively a dry grinding operation.

6. The method of claim 1, wherein the grinding is performed during grinding processing in a concentric grinding path around the at least one defect.

7. The method of claim 1, wherein a number of grinding operations is adjusted based on a size of the at least one defect.

8. The method of claim 1, wherein a multiple of an area of a previously abrasively processed surface is processed by polishing the at least one defect.

9. The method of claim 1, wherein, after the polishing of the at least one defect, the at least one defect is cleaned by a wiping device.

10. The method of claim 1, further comprising:
    performing a result check after the polishing of the at least one defect.

11. A device, comprising:
    a detection station comprising a movable optical detection unit configured to automatically optically scan a surface coating of a workpiece and to store scanned position data in a database, wherein the detection station is configured to identify at least one defect by comparing detected position data with stored target data of the workpiece, and to simulate possible movements of the at least one grinding or polishing tool for processing the at least one defect to generate setting data for the at least one grinding or polishing tool, wherein when an impossibility of automated processing of the at least one defect by the at least one grinding or polishing tool is detected in the simulation of possible movement, the at least one defect is marked and indicated;
    a grinding station comprising at least one grinding tool, which is a robot connected to a computer and having a supporting device attached to an arm of the robot, wherein the arm is moveable in a rotating, vibrating, or orbital manner, and wherein the arm holds an abrasive belt; and
    a polishing station comprising a polishing tool, which a robot connected to the computer and having a supporting plate fastened to an arm of the robot, wherein the arm is moveable a rotating, vibrating, or orbital manner, and wherein the arm holds a polishing sponge,
    wherein the arms of the grinding and polishing stations are configured to be moveable under control of the computer, and
    wherein, before the setting data is transferred to the grinding station or the polishing station, the workpiece is divided into processing areas, wherein the processing areas are calculated based on geometry of the workpiece and accessibility for a respective one of the at least one grinding or polishing tool.

12. The device of claim 11, wherein at least one of the grinding or polishing tools is configured to be movable along a linear axis.

13. The device of claim 11, wherein at least one of the grinding or polishing tools comprises an optical detection unit.

14. The device of claim 11, wherein the polishing tool comprises a wiping device or a blowing device.

* * * * *